United States Patent
Wright et al.

(10) Patent No.: US 9,199,727 B2
(45) Date of Patent: *Dec. 1, 2015

(54) WING TIP DEVICE

(71) Applicants: AIRBUS OPERATIONS LIMITED, Bristol (GB); AIRBUS OPERATIONS GMBH, Hamburg, DE (US)

(72) Inventors: Christopher Wright, Bristol (GB); James K. Chu, Macclesfield (GB); Jan Himisch, Braunschweig (DE)

(73) Assignees: Airbus Operations Limited, Bristol (GB); Airbus Operations GMBH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,007

(22) Filed: Mar. 31, 2015

(65) Prior Publication Data

US 2015/0203191 A1   Jul. 23, 2015

Related U.S. Application Data

(63) Continuation of application No. 13/805,406, filed as application No. PCT/EP2011/061552 on Jul. 7, 2011, now Pat. No. 9,033,282.

(30) Foreign Application Priority Data

Jul. 14, 2010   (GB) .................................. 1011843.8

(51) Int. Cl.
   *B64C 23/06*   (2006.01)
(52) U.S. Cl.
   CPC ............. *B64C 23/065* (2013.01); *Y02T 50/164* (2013.01); *Y10T 29/49716* (2015.01)
(58) Field of Classification Search
   None
   See application file for complete search history.

(56) References Cited

U.S. PATENT DOCUMENTS

| | | | |
|---|---|---|---|
| 994,968 | A | 6/1911 | Barbaudy |
| 1,050,222 | A | 1/1913 | McIntosh |

(Continued)

FOREIGN PATENT DOCUMENTS

| | | |
|---|---|---|
| CN | 101065291 A | 10/2007 |
| DE | 2149956 | 4/1973 |

(Continued)

OTHER PUBLICATIONS

"Aircraft Winglets," Airline World, accessed at https://airlineworld.wordpress.com/2008/10/01/aircraft-winglets/, last accessed on Mar. 2, 2015, 4 pages, Oct. 1, 2008.

(Continued)

*Primary Examiner* — Medhat Badawi
(74) *Attorney, Agent, or Firm* — Sterne, Kessler, Goldstein & Fox P.L.L.C.

(57) ABSTRACT

A wing tip device for fixing to the outboard end of a wing, the wing defining a wing plane, the wing tip device comprising: an upper wing-like element projecting upwardly with respect to the wing plane and having a trailing edge; and a lower wing-like element fixed with respect to the upper wing-like element and having a root chord and a trailing edge, the lower wing-like element root chord intersecting with the upper wing-like element, and the lower wing-like element projecting downwardly from the intersection, wherein the upper wing-like element is larger than the lower wing-like element and the trailing edge of the lower wing-like element is adjacent the trailing edge of the upper wing-like element at the intersection, and wherein an included angle between the upper and lower wing-like elements at the intersection is less than, or equal to, 160 degrees. Also, a wing with the wing tip device; an aircraft with the wing; a method of fitting, or retro-fitting, the wing tip device to a wing; a method of modifying an existing wing tip device; and a method of operating a wing with the wing tip device.

20 Claims, 11 Drawing Sheets

(56) References Cited

U.S. PATENT DOCUMENTS

| | | | |
|---|---|---|---|
| 1,692,081 A | 11/1926 | De La Cierva | |
| 1,710,673 A | 4/1929 | Bonney | |
| 1,841,921 A * | 1/1932 | Spiegel | 244/199.4 |
| 2,123,096 A | 7/1938 | Charpentier | |
| 2,576,981 A | 12/1951 | Vogt | |
| 2,775,419 A | 12/1956 | Hlobil | |
| 2,805,830 A | 9/1957 | Von Zborowski | |
| 2,846,165 A * | 8/1958 | Axelson | 244/90 R |
| 3,029,018 A | 4/1962 | Floyd, Jr. | |
| 3,128,371 A | 4/1964 | Spaulding et al. | |
| 3,270,988 A * | 9/1966 | Cone, Jr. | 244/35 R |
| 3,684,217 A | 8/1972 | Kukon et al. | |
| 3,778,926 A | 12/1973 | Gladych | |
| 4,017,041 A | 4/1977 | Nelson | |
| 4,093,160 A * | 6/1978 | Reighart, II | 244/199.1 |
| 4,108,403 A | 8/1978 | Finch | |
| 4,172,574 A | 10/1979 | Spillman | |
| 4,190,219 A | 2/1980 | Hackett | |
| 4,205,810 A | 6/1980 | Ishimitsu | |
| 4,240,597 A | 12/1980 | Ellis et al. | |
| 4,245,804 A | 1/1981 | Ishimitsu et al. | |
| 4,247,062 A | 1/1981 | Brueckner | |
| D259,554 S | 6/1981 | Parise et al. | |
| 4,365,773 A * | 12/1982 | Wolkovitch | 244/45 R |
| 4,382,569 A | 5/1983 | Boppe et al. | |
| 4,429,844 A | 2/1984 | Brown et al. | |
| 4,444,365 A | 4/1984 | Heuberger | |
| 4,541,593 A * | 9/1985 | Cabrol | 244/45 R |
| 4,545,552 A * | 10/1985 | Welles | 244/90 R |
| 4,598,885 A | 7/1986 | Waitzman | |
| 4,605,183 A | 8/1986 | Gabriel | |
| 4,667,906 A | 5/1987 | Suarez et al. | |
| 4,671,473 A | 6/1987 | Goodson | |
| 4,674,709 A * | 6/1987 | Welles | 244/45 R |
| 4,714,215 A * | 12/1987 | Jupp et al. | 244/199.4 |
| 4,722,499 A * | 2/1988 | Klug | 244/199.4 |
| 4,776,542 A | 10/1988 | Van Dam | |
| 4,949,919 A | 8/1990 | Wajnikonis | |
| 5,039,032 A | 8/1991 | Rudolph | |
| 5,102,068 A | 4/1992 | Gratzer | |
| 5,156,358 A * | 10/1992 | Gerhardt | 244/36 |
| 5,275,358 A * | 1/1994 | Goldhammer et al. | 244/91 |
| 5,348,253 A * | 9/1994 | Gratzer | 244/91 |
| 5,407,153 A * | 4/1995 | Kirk et al. | 244/199.4 |
| 5,634,613 A | 6/1997 | McCarthy | |
| 5,961,068 A | 10/1999 | Wainfan et al. | |
| 5,992,793 A | 11/1999 | Perry et al. | |
| 6,089,502 A | 7/2000 | Herrick et al. | |
| 6,227,487 B1 | 5/2001 | Clark | |
| 6,260,809 B1 | 7/2001 | Egolf et al. | |
| 6,345,790 B1 | 2/2002 | Brix | |
| 6,474,604 B1 | 11/2002 | Carlow | |
| 6,484,968 B2 * | 11/2002 | Felker | 244/91 |
| 6,578,798 B1 | 6/2003 | Dizdarevic et al. | |
| 6,722,615 B2 * | 4/2004 | Heller et al. | 244/199.4 |
| 6,827,314 B2 | 12/2004 | Barriety | |
| 6,886,778 B2 | 5/2005 | McLean | |
| 6,926,345 B2 | 8/2005 | Ortega et al. | |
| 7,048,228 B2 | 5/2006 | Vassberg et al. | |
| 7,275,722 B2 | 10/2007 | Irving et al. | |
| 7,316,371 B2 | 1/2008 | Wyrembek et al. | |
| 7,475,848 B2 | 1/2009 | Morgenstern et al. | |
| D595,211 S | 6/2009 | Cazals | |
| 7,597,285 B2 | 10/2009 | Schweiger | |
| 7,644,892 B1 * | 1/2010 | Alford et al. | 244/199.4 |
| 7,744,038 B2 * | 6/2010 | Sankrithi et al. | 244/199.4 |
| 7,900,876 B2 * | 3/2011 | Eberhardt | 244/199.4 |
| 7,900,877 B1 | 3/2011 | Guida | |
| 7,971,832 B2 * | 7/2011 | Hackett et al. | 244/199.4 |
| 7,980,515 B2 * | 7/2011 | Hunter | 244/198 |
| 7,988,099 B2 | 8/2011 | Bray | |
| 7,988,100 B2 * | 8/2011 | Mann | 244/199.4 |
| 7,997,875 B2 | 8/2011 | Nanukuttan et al. | |
| 8,123,160 B2 * | 2/2012 | Shepshelovich et al. | 244/45 R |
| 8,241,002 B2 * | 8/2012 | Wobben | 416/228 |
| 8,342,456 B2 | 1/2013 | Mann | |
| 8,366,056 B2 * | 2/2013 | Garang | 244/199.4 |
| 8,382,041 B1 | 2/2013 | Yechout | |
| 8,439,313 B2 * | 5/2013 | Rawdon et al. | 244/199.4 |
| 8,490,925 B2 * | 7/2013 | Buescher et al. | 244/199.4 |
| 8,651,427 B1 | 2/2014 | Malachowski et al. | |
| 8,757,555 B2 * | 6/2014 | Werthmann et al. | 244/199.4 |
| 8,944,386 B2 * | 2/2015 | Gratzer | 244/199.4 |
| 9,033,282 B2 | 5/2015 | Wright et al. | |
| 2002/0092947 A1 | 7/2002 | Felker | |
| 2002/0162917 A1 | 11/2002 | Heller et al. | |
| 2005/0173592 A1 | 8/2005 | Houck, II | |
| 2007/0018037 A1 * | 1/2007 | Perlo et al. | 244/45 R |
| 2007/0114327 A1 | 5/2007 | Dees et al. | |
| 2007/0131821 A1 | 6/2007 | Johan | |
| 2007/0252031 A1 | 11/2007 | Hackett et al. | |
| 2008/0116322 A1 * | 5/2008 | May | 244/199.4 |
| 2008/0191099 A1 | 8/2008 | Werthmann et al. | |
| 2008/0308683 A1 | 12/2008 | Sankrithi et al. | |
| 2009/0039204 A1 | 2/2009 | Eberhardt | |
| 2009/0065632 A1 * | 3/2009 | Cazals | 244/15 |
| 2009/0084904 A1 * | 4/2009 | Detert | 244/199.4 |
| 2009/0302167 A1 * | 12/2009 | Desroche | 244/199.4 |
| 2010/0006706 A1 | 1/2010 | Breitsamter et al. | |
| 2010/0019094 A1 * | 1/2010 | Theurich et al. | 244/199.4 |
| 2010/0123047 A1 | 5/2010 | Williams | 244/35 R |
| 2010/0163670 A1 * | 7/2010 | Dizdarevic et al. | 244/36 |
| 2010/0181432 A1 * | 7/2010 | Gratzer | 244/199.4 |
| 2011/0024556 A1 | 2/2011 | Cazals et al. | |
| 2011/0192937 A1 | 8/2011 | Buescher et al. | |
| 2011/0272530 A1 | 11/2011 | Mann | |
| 2012/0049007 A1 | 3/2012 | Hunter | |
| 2012/0049010 A1 * | 3/2012 | Speer | 244/45 R |
| 2012/0091262 A1 | 4/2012 | Rawdon et al. | |
| 2012/0187251 A1 * | 7/2012 | Guida | 244/199.4 |
| 2012/0286102 A1 * | 11/2012 | Sinha et al. | 244/7 B |
| 2012/0286122 A1 | 11/2012 | Tankielun et al. | |
| 2012/0312928 A1 | 12/2012 | Gratzer | |
| 2012/0312929 A1 | 12/2012 | Gratzer | |
| 2013/0256460 A1 * | 10/2013 | Roman et al. | 244/199.4 |
| 2014/0346281 A1 | 11/2014 | Gratzer | |
| 2015/0197331 A1 | 7/2015 | Wright et al. | |

FOREIGN PATENT DOCUMENTS

| | | |
|---|---|---|
| DE | 3638347 A1 | 5/1988 |
| DE | 197 52 369 A1 | 5/1999 |
| DE | 20211664 U1 | 1/2003 |
| DE | 10207767 A1 | 9/2003 |
| EP | 0 094 064 A1 | 11/1983 |
| EP | 0 122 790 A1 | 10/1984 |
| EP | 1 375 342 A1 | 1/2004 |
| EP | 1 924 493 B1 | 4/2009 |
| EP | 1 883 577 B1 | 1/2010 |
| EP | 2 281 747 A2 | 2/2011 |
| EP | 2 084 059 B1 | 2/2012 |
| EP | 2 274 202 B1 | 2/2012 |
| FR | 418656 A | 12/1910 |
| FR | 444 080 A | 10/1912 |
| FR | 726 674 A | 6/1932 |
| GB | 2282996 A | 4/1995 |
| JP | S63-154399 | 6/1988 |
| WO | WO 82/04426 A1 | 12/1982 |
| WO | WO 95/11159 A1 | 4/1995 |
| WO | WO 03/000547 A1 | 1/2003 |
| WO | WO 2005/099380 A2 | 10/2005 |
| WO | WO 2007/031732 A1 | 3/2007 |
| WO | WO 2008/031620 A2 | 3/2008 |
| WO | WO 2008/061739 A1 | 5/2008 |
| WO | WO 2009/155584 A1 | 12/2009 |
| WO | WO 2010/124877 A1 | 11/2010 |
| WO | WO 2012/171023 A1 | 12/2012 |
| WO | WO 2012/171034 A1 | 12/2012 |
| WO | WO 2013/007396 A1 | 1/2013 |

OTHER PUBLICATIONS

"HpH 304S Flight Test Results," Texas Soaring Association, Johnson/Carswell Memorial Flight Test Series, Soaring Magazine, 8 pages, Jan. 2010.

(56) References Cited

OTHER PUBLICATIONS

"Korean Air, How Much Have You Seen (KAL OC tour)?" Hanjin Group, Korean Air, 3 pages, Feb. 22, 2011.
"MD-11 Airplane Characteristics for Airport Planning," McDonnell Douglas, Douglas Aircraft Company, 104 pages, Oct. 1990.
"MD-12 Technical Overview," McDonnell Douglas, Douglas Aircraft Company, 4 pages, Sep. 1992.
"NASA Conference Publication 2036 Part II: CTOL Transport Technology—1978," Conference Proceedings, 414 pages, Feb. 28-Mar. 3, 1978.
"NASA Contractor Report 3164: Selected Advanced Aerodynamics and Active Controls Technology Concepts Development on a Derivative B-747 Aircraft, Final Report," Staff of Boeing Commercial Airplane Company, The Boeing Commercial Airplane Company, 303 pages, 1980.
"NASA Contractor Report 3704: DC-10 Winglet Flight Evaluation," Staff of Douglas Aircraft Company, McDonnell Douglas Corporation, 154 pages, Jun. 1983.
"Watch Out for the Shark," Sailplane & Gliding Magazine, 68 pages, Apr.-May 2007.
"What is Relationship Between Airplane Wing Shape and Flying?" Original Korean Publication, 52 pages, Jul. 1, 2010.
Berens, M., "Potential of Multi-Winglet Systems to Improve Aircraft Performance," Technischen Universität Berlin, 265 pages, 2008.
English languages abstract of DE 19752369 A1, Thomson Innovation, http://www.thomsoninnovation.com, accessed Dec. 8. 2014, listed as document FP10 on the accompanying form PTO/SB/08A; 6 pages.
English language abstract of DE 3638347 A1, Thomson Innovation, http://www.thomsoninnovation.com, accessed Dec. 8, 2014, listed as document FP08 on the accompanying form PTO/SB/08A; 5 pages.
English language translation of DE 2149956 A, European Patent Office, http://translationportal.epo.org, accessed. Dec. 8, 2014, listed as document FP04 on the accompanying form PTO/SB/08A; 2 pages.
English language translation of FR 418,656 A, European Patent Office, http://translationportal.epo.org, accessed Dec. 8, 2014, listed as document FP01 on the accompanying form PTO/SB/08A; 2 pages.
English language translation of FR 444,080 A, European Patent Office, http://translationportal.epo.org, accessed Dec. 8, 2014, listed as document FP02 on the accompanying form PTO/SB/08A; 4 pages.
English language translation of FR 726,674 A, European Patent Office, http://translationportal.epo.org, accessed Dec. 8, 2014, listed as document FP03 on the accompanying form PTO/SB/08A; 2 pages.
European Search Report mailed May 24, 2013 for corresponding application No. 13161204.6.
Gardner, J.E., et al, "NASA Technical Memorandum 87676: Loads and Aeroelasticity Division Research and Technology Accomplishments for FY 1985 and Plans for FY 1986," 126 pages, Jan. 1986.
Gilkey, R.D., "NASA Contractor Report 3119: Design aand Wind Tunnel Tests of Winglets on a DC-10 Wing," 53 pages, Apr. 1979.
Hale, A.I., "Investigation into the Application of Winglets on Canards for Tip Vortex Position Improvement," University of New South Wales-Canberra. 9 pages, 2009.
Hogge, J.V., "Development of a Miniature VTOL Tail-Sitter Unmanned Aerial Vehicle," Brigham Young University—Provo, 108 pages, Apr. 22, 2008.
International Search Report and Written Opinion corresponding to PCT/EP2011/061552, dated Oct. 7, 2011.
Japanese Patent Office, Office Action mailed Jan. 28, 2014, in Japanese Application No. 2013-519037.
Jones, R.T., Lasinski, T.A., "Effects of Winglets on the Induced Drag of Ideal Wing Shapes," NASA TM 81230, Sep. 1980.
McLean, D., "Wingtip Devices: What They Do and How They Do It," Boeing Aerodynamics, 2005 Performance and Flight Operations Engineering Conference, 20 pages, 2005.
Portillo, A.C., "Final Year Project Report: CFD Analysis of Winglets," Glyndŵr University, 82 pages, May 2011.
Reijerkerk, M., "Aeroelastic Model Identification of Winglet Loads from Flight Test Data," 332 pages, 2008.
Satran, D.R., "NASA Technical Paper 2623; Wind-Tunnel Investigation of the Flight Characteristics of a Canard General-Aviation Airplane Configuration," 59 pages, Oct. 1986.
Search Report corresponding to GB 1011843.8. dated Sep. 29, 2010.
Taylor, A.B., "NASA Contractor Report 3781: Development of Selected Advanced Aerodynamics and Active Control Concepts for Commercial Transport Aircraft," 89 pages, Feb. 1984.
Weierman, J. et al., "Winglet Design and Optimization for UAVs," 28th AIAA Applied Aerodynamics Conference, 14 pages, Jun. 28-Jul. 1, 2010.
Weierman, J., "Winglet Design and Optimization for UAVS," Oklahoma State University, 107 pages, Jul. 2010.
Whitcomb, R.T., "A Design Approach and Selected Wind Tunnel Results At High Subsonic Speeds for Wing-Tip Mounted Winglets," NASA TN D-8260, 1976.
Whitcomb, R.T., "NASA Technical Note D-8260: A Design Approach and Selected Wind-Tunnel Results at High Subsonic Speeds for Wing-Tip Mounted Winglets," 33 pages, Jul. 1976.
Zimmer, H., "NASA Technical Memorandum 88534: The Aerodynamic Optimization of Wings at Subsonic Speeds and the Influence of Wingtip Design," 105 pages, May 1987.
McDonnell Douglas Press Release, "McDonnell Douglas Unveils New MD-XX Trijet Design," dated Sep. 4, 1996; 1 page.
Norris, "MDC sets October date for MD-XX," Flight International, Sep. 18-24, 1996; 1 page.
MD-XX LR, Exhibit D6 submitted in the European Patent Office Notice of Opposition corresponding to EP 293362B1, dated Jun. 3, 2015; 1 page.
MD-XX Stretch, Exhibit D7 submitted in the European Patent Office Notice of Opposition corresponding to EP 2593362B1, dated Jun. 3, 2015; 1 page.
MD-XX photo model, Exhibit D8 submitted in the European Patent Office Notice of Opposition corresponding to EP 2593362B1, dated Jun. 3, 2015; 1 page.
Photo of frame of D8, dated Nov. 18, 1996, Exhibit D9 submitted in the European Patent Office Notice of Opposition corresponding to EP 2593362B1, dated Jun. 3, 2015; 1 page.
MD-XX Stretch & MD-XX LR, dated Aug. 28, 1996, Exhibit D10 submitted in the European Patent Office Notice of Opposition corresponding to EP 2593362B1, dated Jun. 3, 2015; 1 page.
Jameson, "Re-Engineering the Design Process Through Computation," Journal of Aircraft, vol. 36, No. 1, published Jan.-Feb. 1999; pp. 36-50.
General Arrangements—MD-12, Exhibit D13 submitted in the European Patent Office Notice of Opposition corresponding to EP 2593362B1, dated Jun. 3, 2015; 1 page.
Close-up of a part of D13, Exhibit D14 submitted in the European Patent Office Notice of Opposition corresponding to EP 2593362B1, dated Jun. 3, 2015; 1 page.
Kroo, "Nonplanar Wing Concepts for Increased Aircraft Efficiency," VKJ Lecture series on Innovative Configurations and Advanced Concepts for Future Civil Aircraft, Jun. 6-10, 2005; pp. 1-29.
"Assessment of Wingtip Modification to Increase the Fuel Efficiency of Air Force Aircraft," National Academy of Sciences, 2007; 113 pages.
European Patent Office Notice of Opposition corresponding to EP 2593362B1, dated Jun. 3, 2015; 21 pages.
"737 Airplane Characteristics for Airport Planning," Boeing Commercial Airplanes, pp. 31-46, Jul. 2007.
"Aerodynamic Principles of Winglets," Engineering Sciences Data Unit, Jun. 1998.
Blackwell, J., "Numerical Method to Calculate the Induced Drag or Optimum Loading for Arbitrary Non-Planar Aircraft," May 1976.
Dahlin, J.A., "Aerodynamic Evaluation of Winglets for Transport Aircraft", 14th AIAA Fluid and Plasma Dynamics Conference, Jun. 1981.
Faye, R. et al., "Aero 17: Blended Winglets for Improved Airplane Performance," Aero Magazine, Jan. 2002.
Heyson, H. et al., "Theoretical Parametric Study of the Relative Advantages of Winglets and Wing-Tip Extensions," NASA TP-1020, Jul. 1977.
Ishimitsu, K., "Aerodynamic Design and Analysis of Winglets," AIAA Aircraft Systems and Technology Meeting, Sep. 1976.

(56) References Cited

OTHER PUBLICATIONS

Ishimitsu, K., "Design and Analysis of Winglets for Military Aircraft, Phase II," Air Force Flight Dynamics Laboratory, Nov. 1977.
Kroo, I., "Drag Due to Lift: Concepts for Prediction and Reduction," Annual Review Fluid Mechanics 2001, 2000.
McCallum, C., "Aviation Partners Boeing—Blended Winglets Programs," Aviation Partners Boeing, Jul. 2004.
Nangia, R. et al., "Aerodynamic Design Studies of Conventional & Unconventional Wings with Winglets," AIAA, Jun. 2006.
Ostrower, J., "Airbus A320 flies with Aviation Partners blended winglets," Flightglobal, http://www.flightglobal.com/blogs/flightblogger/2008/12/airbus_a320_flies_with_aviatio/, Dec. 2008.
"Photographs of the Airbus A320 MSN001 Aircraft Fitted With The API Winglets," AirLiners.net, Dec. 2008-Jan. 2009.
Taylor, A., "DC-10 Winglet Flight Evaluation Summary Report," NASA Contractor Report 3784, Dec. 1983.
Treadgold, D., "Notes on Recent Research on Non-Planar Wing Tip Designs," May 1987.
"What is Aviation Partners Boeing?" 2005.

\* cited by examiner

FIG. 2 (Prior Art)
Detail A
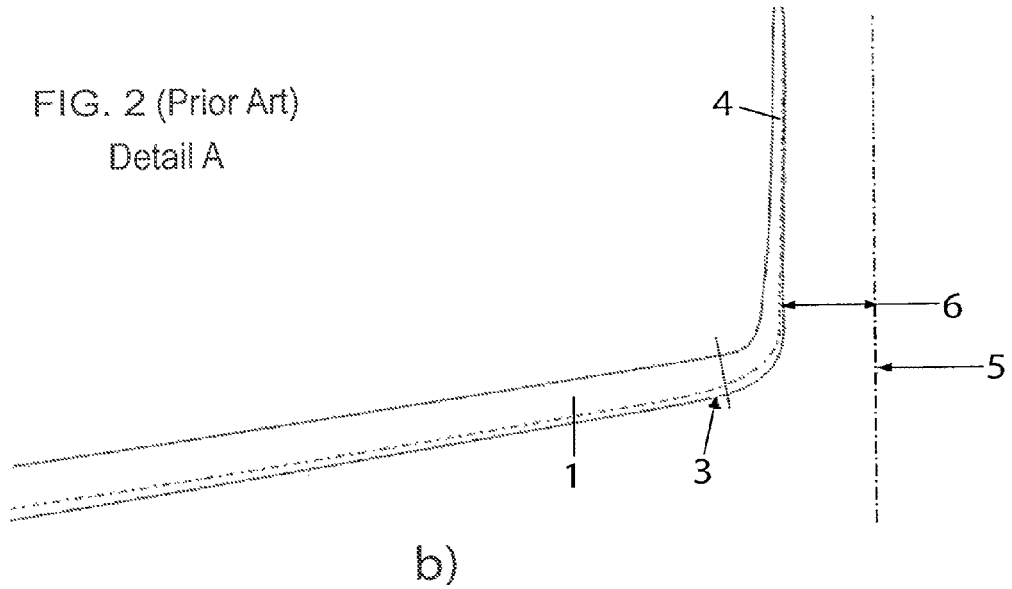
b)
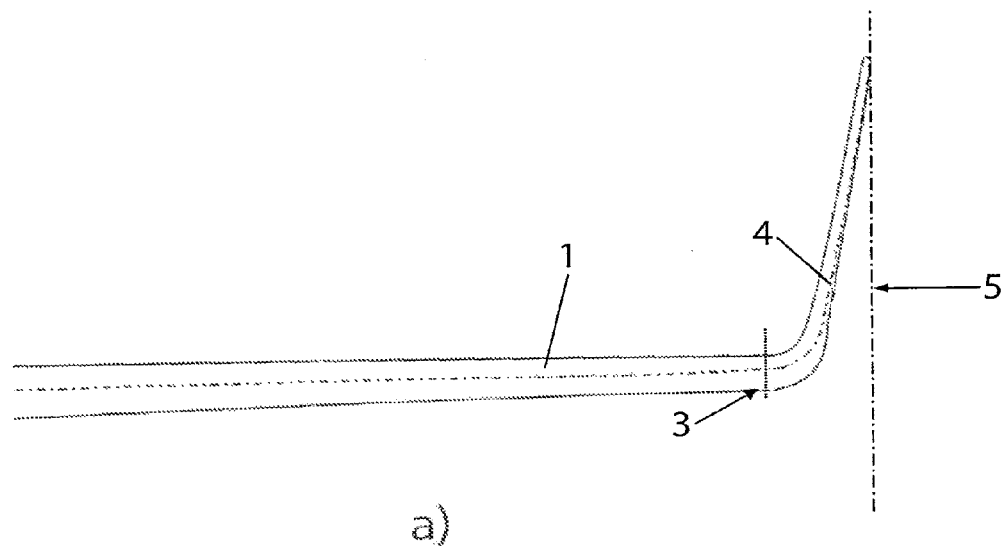
a)

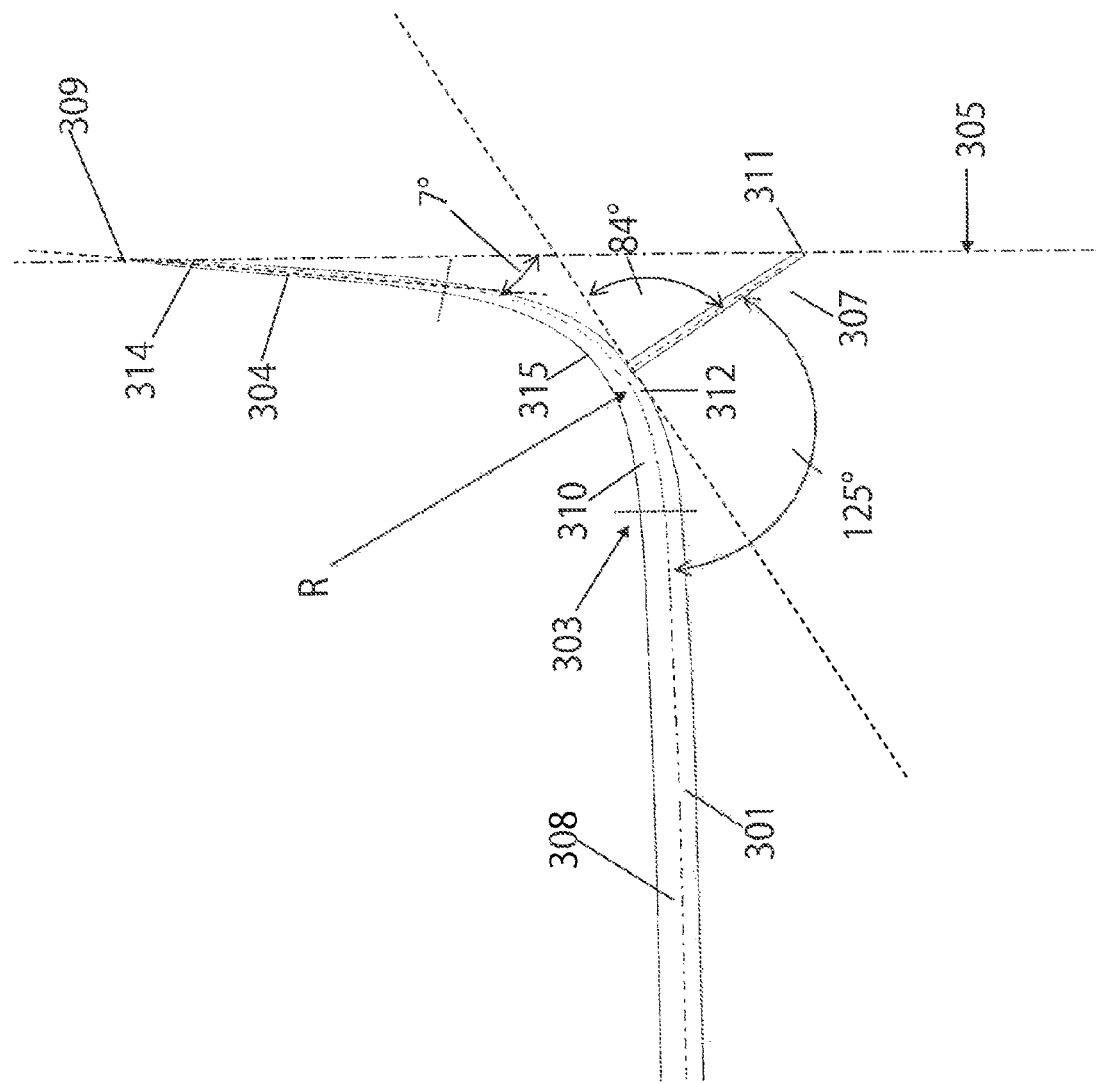

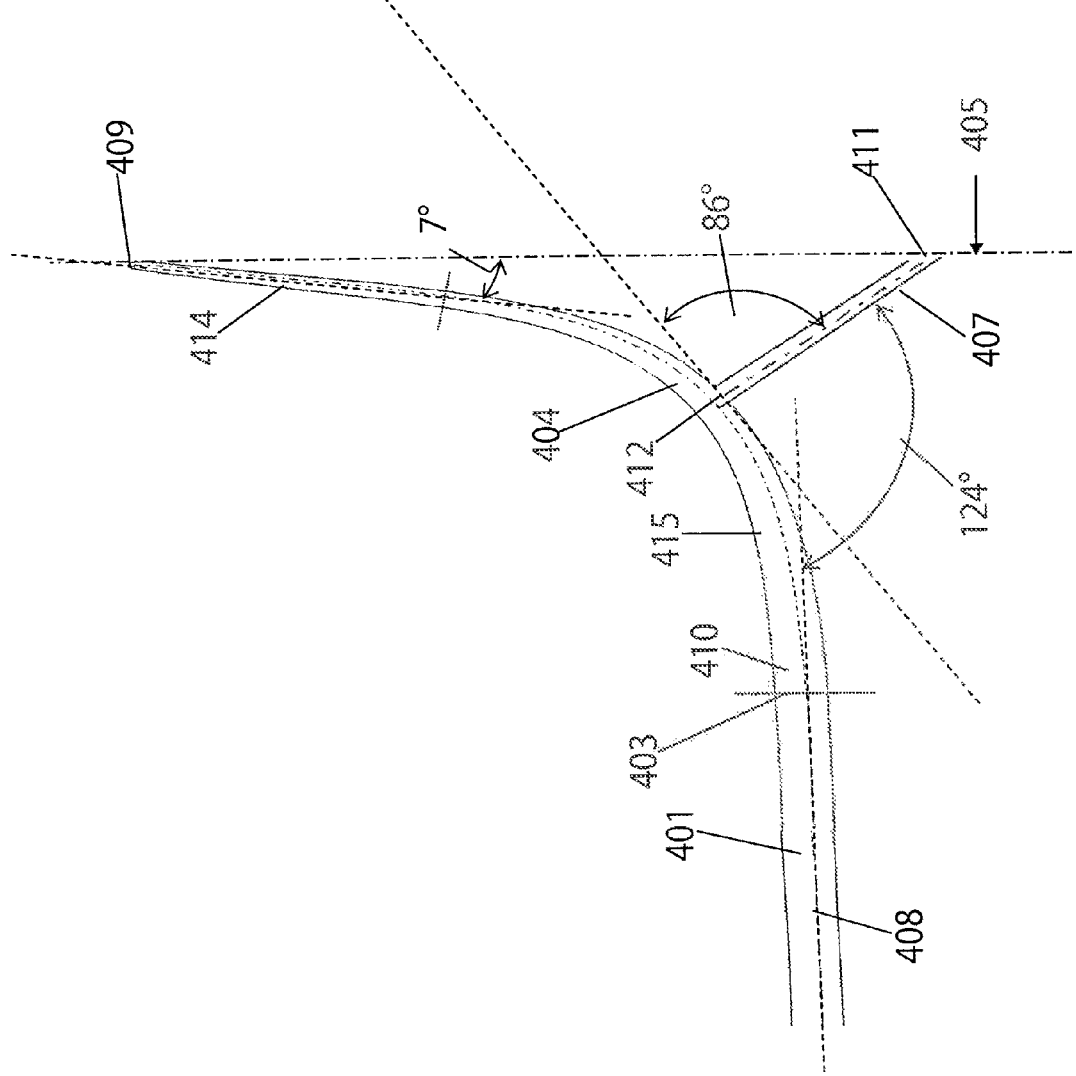

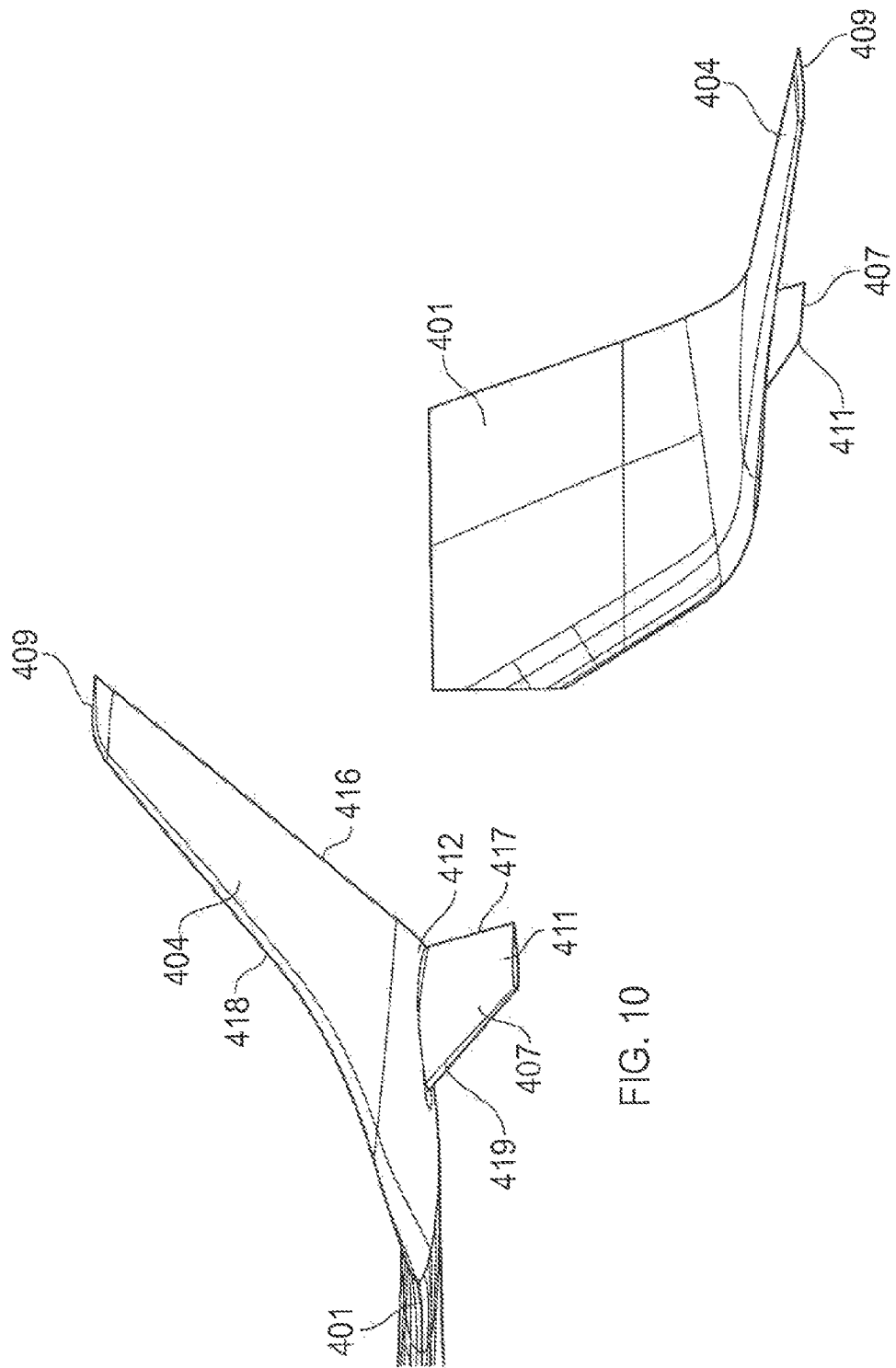

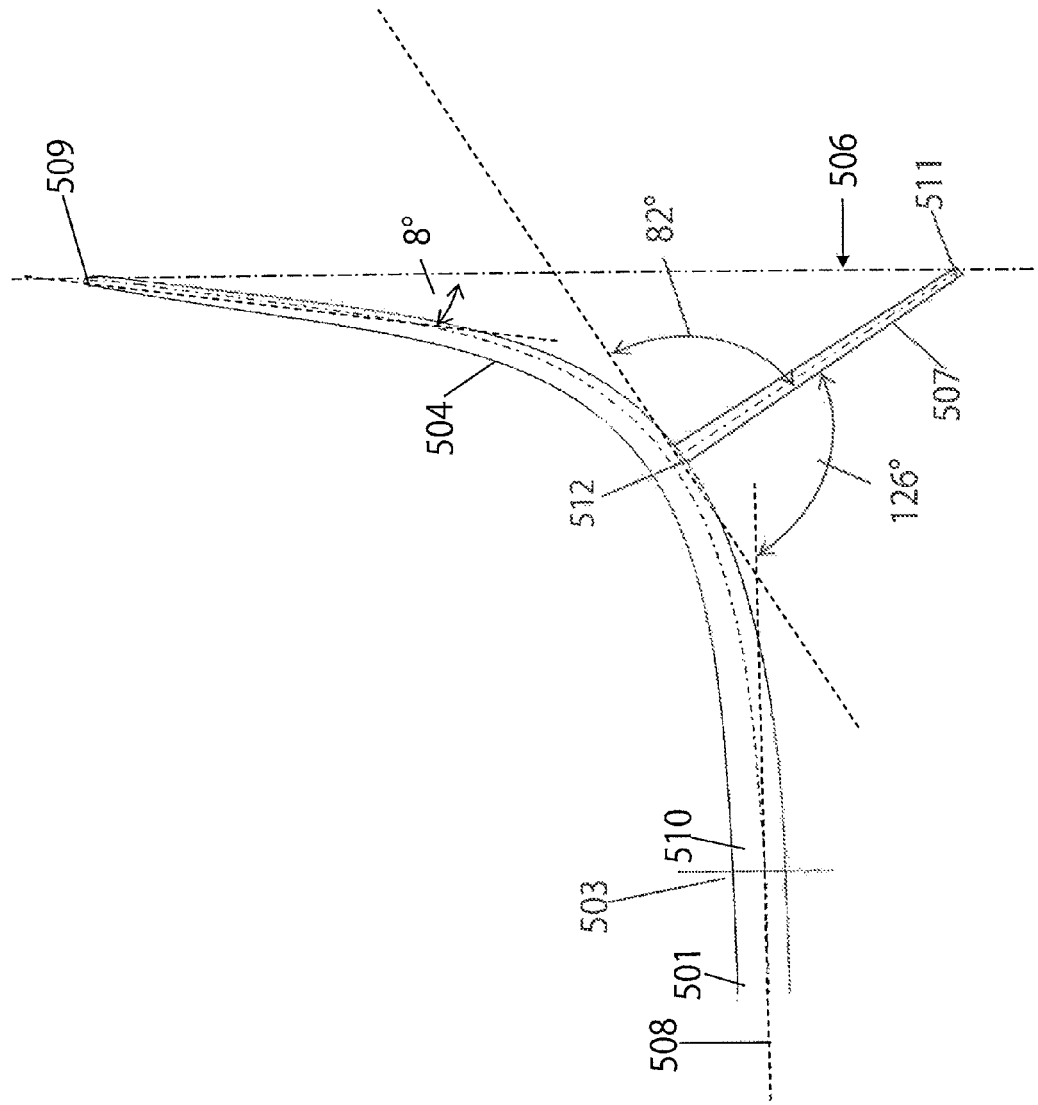

US 9,199,727 B2

WING TIP DEVICE

RELATED APPLICATIONS

The present application is a continuation of U.S. application Ser. No. 13/805,406, filed Dec. 19, 2012, which is the National Phase of International Application Number PCT/EP2011/061552, filed Jul. 7, 2011, and claims priority from British Application Number 1011843.8, filed Jul. 14, 2010.

FIELD OF THE INVENTION

The present invention relates to a wing tip device for fixing to the outboard end of a wing. Also, a wing with the wing tip device; an aircraft with the wing; a method of fitting, or retro-fitting, the wing tip device to a wing; a method of modifying an existing wing tip device; and a method of operating a wing with the wing tip device.

BACKGROUND OF THE INVENTION

A wing tip device is attached to the outboard end of a wing to reduce induced drag on the wing. In the case of e.g. an aircraft wing this can lead to improved fuel efficiency and reduced carbon emissions. Wing tip devices can take a variety of forms.

A winglet is a wing-like element that extends from the wing tip. A winglet may extend upwardly or downwardly from the wing tip. NASA TN D-8260 entitled "*A Design Approach and Selected Wind-Tunnel Results at High Subsonic Speeds for Wing-Tip Mounted Winglets*"; Whitcomb, R. T.; 1976 describes a wing tip device having a lower winglet (extending downwardly from the wing tip) forward of an upper winglet (extending upwardly from the wing tip). The sizing of these tip devices are recommended in NASA T M 81230 entitled "*Effect of Winglets on the Induced Drag of Ideal Wing Shapes*"; R T Jones and T A Lasinski 1980.

A wing tip fence is a special form of wing tip device that extends vertically both above and below the wing tip. U.S. Pat. No. 4,714,215 describes a wing tip fence.

Another example of a wing tip device is a non-planar wing tip extension, i.e. it extends out of the plane of the wing to which it is attached. A winglet may be considered to be a particular example of a non-planar wing tip extension. US 2002/0162917 describes a non-planar wing tip extension having continuously increasing curvature of local dihedral, continuously increasing sweepback (at both leading and tailing edges), and continuously decreasing chord in the outboard direction.

A winglet may include a substantially planar portion joined to the wing tip by a curved transition portion to form blended winglet, such as described in U.S. Pat. No. 5,348,253. The transition portion has a constant radius of curvature. The specified blend is said to reduce interference drag effects at the wing tip.

Alternatively, a winglet may include a substantially planar portion joined to the wing tip by a non-planar wing tip extension portion, such as described in WO 2008/061739. The non-planar wing tip extension portion has increasing curvature of local dihedral in the outboard direction. The wing tip extension portion is said to further reduce interference drag effects compared to a blended winglet with a constant radius transition.

Another example of a wing device is a substantially planar wing tip extension, such as the raked wing tip described in U.S. Pat. No. 6,089,502, which does not extend substantially out of the plane of the wing. Raked wing tips can achieve similar drag reduction performance to winglets.

Span constraints on aircraft, due to e.g. airport compatibility gate limits or aircraft category flying constraints, mean that winglets or non-planar tip extensions, rather than raked wing tips, may need to be adopted in order to reduce induced drag on the wing. Since winglets (and non-planar wing tip extensions more generally) extend out of the plane of the wing to which they are attached, an effective increase in the wing aspect ratio can be achieved (which reduces the vortex-induced drag on the wing) without significantly increasing wing span.

The problem of span constraints is traditionally solved by optimising the wing span of the aircraft in the (full fuel load) ground shape where the span constraints are applicable. However, due to the bend induced on the wing shape from aeroelastic effects during flight, the wing span of the resulting flight shape is usually reduced and is therefore no longer optimal. This traditional approach therefore carries a performance shortfall. This problem becomes even more appreciable with greater use of relatively flexible wings to reduce structural weight, which tend to result in increased wing bending under aerodynamic load when compared to more rigid designs.

SUMMARY OF THE INVENTION

A first aspect of the invention provides a wing tip device for fixing to the outboard end of a wing, the wing defining a wing plane, the wing tip device comprising: an upper wing-like element projecting upwardly with respect to the wing plane and having a trailing edge; and a lower wing-like element fixed with respect to the upper wing-like element and having a root chord and a trailing edge, the lower wing-like element root chord intersecting with the upper wing-like element, and the lower wing-like element projecting downwardly from the intersection, wherein the upper wing-like element is larger than the lower wing-like element and the trailing edge of the lower wing-like element is adjacent the trailing edge of the upper wing-like element at the intersection, and wherein an included angle between the upper and lower wing-like elements at the intersection is less than, or equal to, 160 degrees.

A second aspect of the invention provides a wing having an outboard end and a wing tip device in accordance with the first aspect fixed to its outboard end.

A third aspect of the invention provides an aircraft having a wing according to the second aspect.

A fourth aspect of the invention provides a method of fitting, or retro-fitting, a wing tip device to a wing, the method comprising fixing a wing tip device in accordance with the first aspect to the outboard end of a wing.

A fifth aspect of the invention provides a method of modifying a wing tip device fixed to, or for fixing to, the outboard end of a wing, the wing defining a wing plane, the existing wing tip device comprising an upper wing-like element projecting upwardly with respect to the wing plane and having a trailing edge, and the method comprising providing a lower wing-like element smaller than the upper wing-like element and having a root chord and a trailing edge, and fixing the lower wing-like element to the upper wing-like element such that: the lower wing-like element root chord intersects with the upper wing-like element, and the lower wing-like element projects downwardly from the intersection; and that the trailing edge of the lower wing-like element is adjacent the trailing edge of the upper wing-like element at the intersection;

and that an included angle between the upper and lower wing-like elements at the intersection is less than, or equal to, 160 degrees.

A sixth aspect of the invention provides a method of operating a wing having a wing tip device fixed to the outboard end of the wing, the wing defining a wing plane, and the wing tip device comprising: an upper wing-like element projecting upwardly with respect to the wing plane and having a trailing edge; and a lower wing-like element fixed with respect to the upper wing-like element and having a root chord and a trailing edge, the lower wing-like element root chord intersecting with the upper wing-like element, and the lower wing-like element projecting downwardly from the intersection, wherein the upper wing-like element is larger than the lower wing-like element and the trailing edge of the lower wing-like element is adjacent the trailing edge of the upper wing-like element at the intersection, and wherein an included angle between the upper and lower wing-like elements at the intersection is less than, or equal to, 160 degrees, and the method comprising subjecting the wing to aerodynamic loads such that the wing shape undergoes aeroelastic deformation to a state in which wing bending causes rotation of the wing tip device about the wing root such that the tip of the lower wing-like element extends further outboard in the spanwise direction than the tip of the upper wing-like element.

The invention is advantageous in that the lower wing-like element acts to offset at least some of the decrease in wing span that occurs due to aeroelastic deformation in the flight shape, whilst the upper and lower wing-like elements may still be optimised to meet any applicable span constraints in the ground shape. The addition of the lower element to a wing tip device comprising only an upper wing-like element (e.g. a winglet) has been shown to reduce drag on the wing/wing tip device combination by around a further 1.9% overall, with a vortex drag reduction of around a further 25 to 40% relative to that provided by the upper element alone.

Near coincidence of the upper and lower element trailing edges is important to avoid wake disturbance effects. The trailing edges need not be exactly coincident but must be adjacent so as to avoid the wake of one element impacting on the flow over the other element at the intersection.

The included angle between the upper and lower wing-like elements at the intersection is important such that the lower element provides an increase in span in the flight shape. The cant angle of the lower element (i.e. the angle between the vertical x-z plane and the element) may be optimised in order to achieve the maximum span increase in the flight shape, with due consideration to minimising interference effects at the intersection. Note that a wing tip fence has an approximately 180 degree included angle between vertical upper and lower elements, and so the lower element provides negligible increase in span in the flight shape.

The upper wing-like element is larger than the lower wing-like element. The lower wing-like element may have an element planform area less than approximately 25% of the upper wing-like element planform area. Note that the planform area of each element is viewed in a plane different to that of the wing planform area. The planform area of the lower element may be designed in order to deliver the required span loading while minimising the cruise viscous drag penalty, and to provide good low speed high lift performance. Ground height clearance constraints may limit the size of the lower element.

The lower wing-like element is fixed with respect to the upper wing-like element. The wing tip device is fixed with respect to the wing. The invention is not concerned with moveable wing tip devices as these are generally heavier than fixed devices, which may offset any performance benefit.

Also, solving the problem of span constraints is somewhat trivial with moveable wing tip devices.

An included angle between the wing plane and the lower wing-like element may be at least 110 degrees. The lower element therefore extends outboard from the outboard end of the wing, and interference effects between the wing lower surface and the lower element can be minimised.

The included angle between the upper and lower wing-like elements at the intersection may be at least 80 degrees, and preferably is at least 90 degrees. This helps minimise interference effects between the upper and lower elements at the intersection.

The lower wing-like element may be substantially planar.

Alternatively, the lower wing-like element may be substantially non-planar. In particular, the lower element may have wing twist, e.g. wash-out. The lower element may have a spanwise curvature of increasing anhedral from root to tip.

The lower element may have a toe angle relative to the vertical x-z plane.

The lower element may have a sweep back angle. In particular, the lower element may have a swept back leading edge. The sweep back angle of the lower element leading edge may be similar to that of the upper element.

The upper wing-like element may include a substantially planar portion.

In one embodiment, the upper wing-like element may be substantially planar. The upper element may be a winglet.

In another embodiment, the upper wing-like element may include a substantially planar portion and an arcuate transition portion adapted to smoothly blend the outboard end of the wing into the substantially planar portion of the upper wing-like element. The upper element may be a blended winglet. The transition portion may have a constant radius of curvature. The blend helps to reduce interference drag effects at the wing tip.

In yet another embodiment, the upper wing-like element may include a substantially planar portion and a non-planar curved wing tip extension adapted to smoothly blend the outboard end of the wing into the substantially planar portion of the upper wing-like element. The upper element may be a winglet blended into the wing by a non-planar wing tip extension portion. The non-planar wing tip extension portion may have increasing curvature of local dihedral in the outboard direction. The wing tip extension portion helps to further reduce interference drag effects compared to a blended winglet with a constant radius transition.

The upper wing-like element may be a substantially non-planar curved wing tip extension. The extension may have continuously increasing curvature of local dihedral, continuously increasing sweepback (at both leading and tailing edges), and continuously decreasing chord in the outboard direction.

The upper wing-like element may have a wing twist from root to tip, e.g. wash-out.

The upper wing-like element may have a toe angle relative to the vertical x-z plane.

The upper wing-like element may have a sweep back angle. In particular, the upper element may have a swept back leading edge. The sweep back angle of the upper element leading edge may be similar to that of the lower element.

The intersection between the lower wing-like element and the upper wing-like element may be at the outboard end of the wing.

Alternatively, the intersection between the lower wing-like element and the upper wing-like element may be outboard of the outboard end of the wing. This may be particularly advantageous where the upper element is smoothly blended into the outboard end of the wing. In this case, the intersection may be on the lower surface of the upper element.

The root chord of the lower element may extend along only part of the local chord of the upper element at the intersection.

When the aircraft is on the ground and the wing is subjected to downward deflection due to full fuel load, the tip of the lower wing-like element may extend no further outboard in the spanwise direction than the tip of the upper wing-like element. In this way both upper and lower element tips may be at the airport gate limit, for example.

When the aircraft is on the ground and the wing is subjected to downward deflection due to full fuel load, the spanwise extent of the tip of the lower wing-like element may be substantially equal to the spanwise extent of the tip of the upper wing-like element. Alternatively, the spanwise extent of the tip of the lower wing-like element may be greater than the spanwise extent of the tip of the upper wing-like element when the span of the tip of the upper element is substantially less than the airport gate limit.

When the aircraft is in flight, the tip of the lower wing-like element may extend further outboard in the spanwise direction than the tip of the upper wing-like element due to aeroelastic deformation of the wing shape.

BRIEF DESCRIPTION OF THE DRAWINGS

Embodiments of the invention will now be described with reference to the accompanying drawings, in which:

FIG. 2 illustrates Detail A of FIG. 1 showing the span-limit on the ground, and the loss of span due to wing deformation under aerodynamic load;

FIG. 8 illustrates an aircraft wing/wing tip device (in the ground shape) according to a third embodiment having a blended upper winglet and a planar lower winglet;

FIG. 9 illustrates an aircraft wing/wing tip device (in the ground shape) according to a fourth embodiment having an upper winglet blended into the wing with a non-planar wing tip extension, and a planar lower winglet (although a non-planar lower winglet may also be applied); and FIG. 10 illustrates a perspective view of the wing/wing tip device of the fourth embodiment;

FIG. 11 illustrates a plan view of the wing/wing tip device of the fourth embodiment;

FIG. 12 illustrates an aircraft wing/wing tip device according to a fifth embodiment having a non-planar (upper) wing tip extension and a planar lower winglet.

DETAILED DESCRIPTION OF EMBODIMENT(S)

Figure 1:
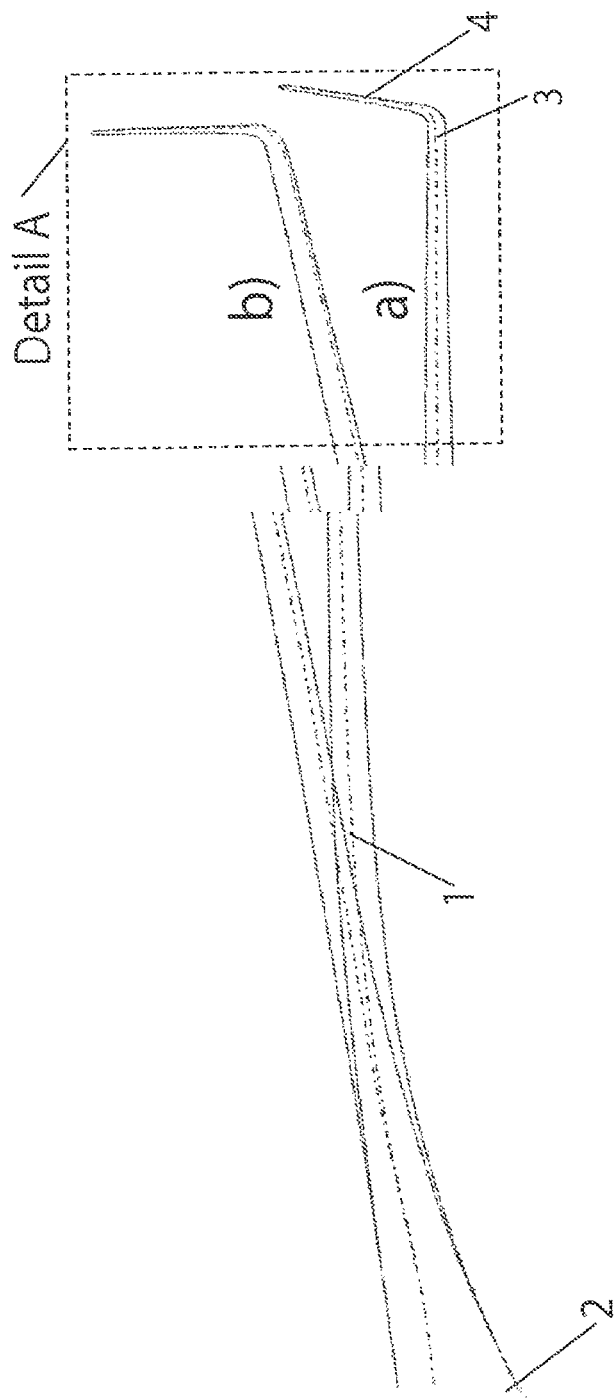
FIG. 1 illustrates a prior art aircraft wing with an upper winglet, shown a) in its ground shape, and b) in its flight shape.

FIG. 1 illustrates a prior art aircraft wing 1 having an inboard wing root 2 and an outboard wing tip 3. A wing tip device comprising an upwardly extending winglet 4 is fixed to the outboard end 3 of the wing 1. The wing 1 is shown in FIG. 1 in a) its ground shape (i.e. with the aircraft on the ground and with a full fuel load in the wing), and b) its flight shape (i.e. with deformation due to aerodynamic load).

FIG. 2 illustrates Detail A of FIG. 1 and the broken line 5 illustrates a span constraint imposed on the aircraft due to e.g. airport compatibility gate limits or aircraft category flying constraints. The span limit 5 is applicable for the ground shape shown in FIG. 2a). FIG. 2b) illustrates the loss 6 in wing span due to wing deformation in the flight shape. This loss in span 6 may be up to around 3%.

Figure 3:
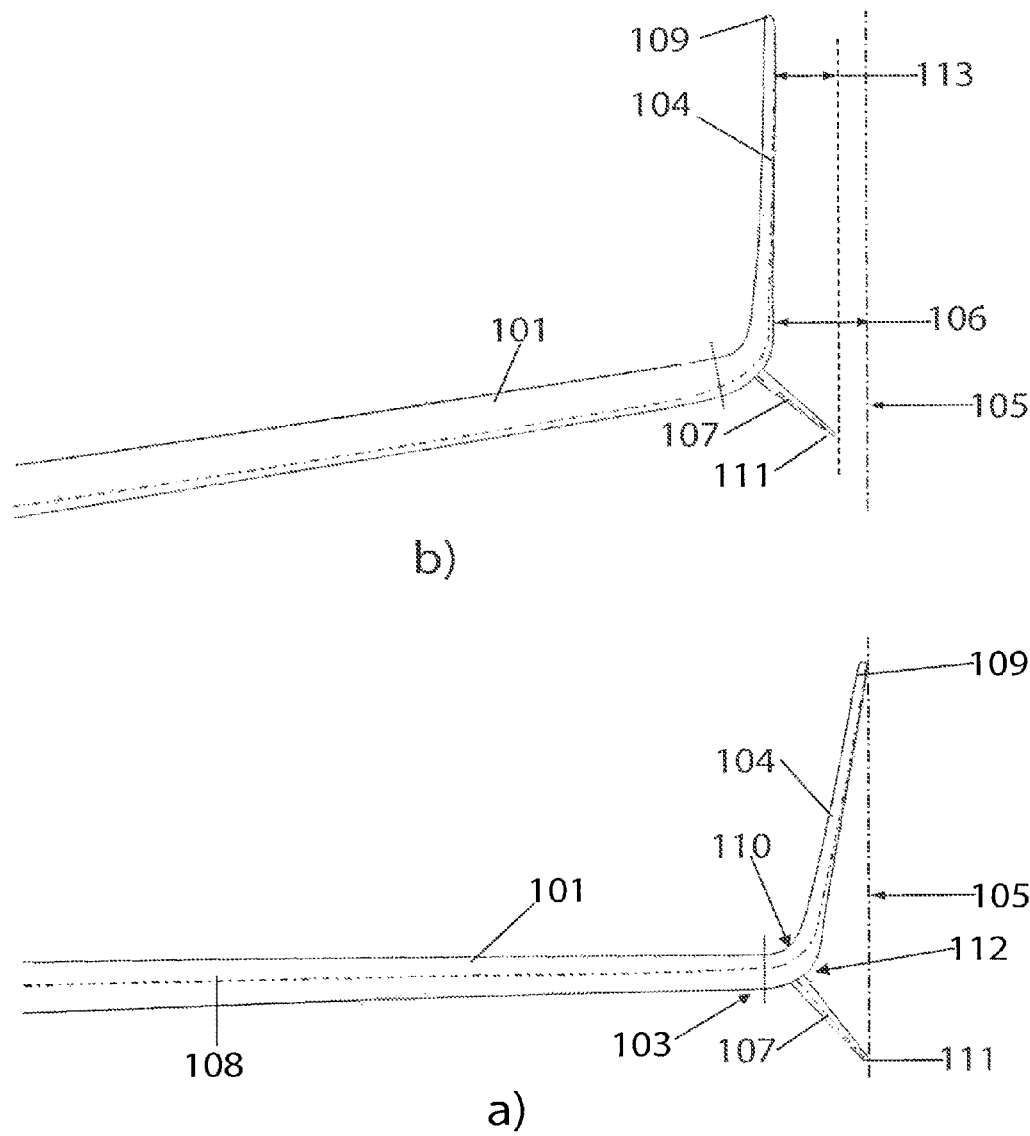
FIG. 3 illustrates an aircraft wing/wing tip device according to a first embodiment having a planar upper winglet and a planar lower winglet, shown a) in its ground shape, and b) in its flight shape, and illustrating the span gained from the lower element in the flight shape.

FIG. 3 illustrates an aircraft wing 101 according to a first embodiment having a planar upper winglet 104 and a planar lower winglet 107. The upper winglet 104 is fixed to the outboard end 103 of the wing 101. The wing 101 defines a wing plane 108. The upper winglet 104 projects upwardly with respect to the wing plane 108. The upper winglet 104 has a tip 109 and a root 110. The lower winglet has a tip 111 and a root 112. The lower winglet root chord 112 intersects with the upper winglet 104 and the lower winglet 107 projects downwardly from this intersection. The upper and lower winglets 104, 107 each have a leading edge and a trailing edge and the trailing edges are adjacent at the intersection. FIG. 3a) illustrates the wing 101 in its ground shape where the tip 109 of the upper winglet 104 and the tip 111 of the lower winglet 107 are coincident at the span limit 105. FIG. 3b) illustrates the wing 101 in its deformed flight shape and shows how a potential loss in span 106 due to the upper winglet 104 is mitigated by an increase in span 113 gained from the lower winglet 107. This gain in span 113 due to the lower winglet 107 is approximately 2%.

Figure 4:
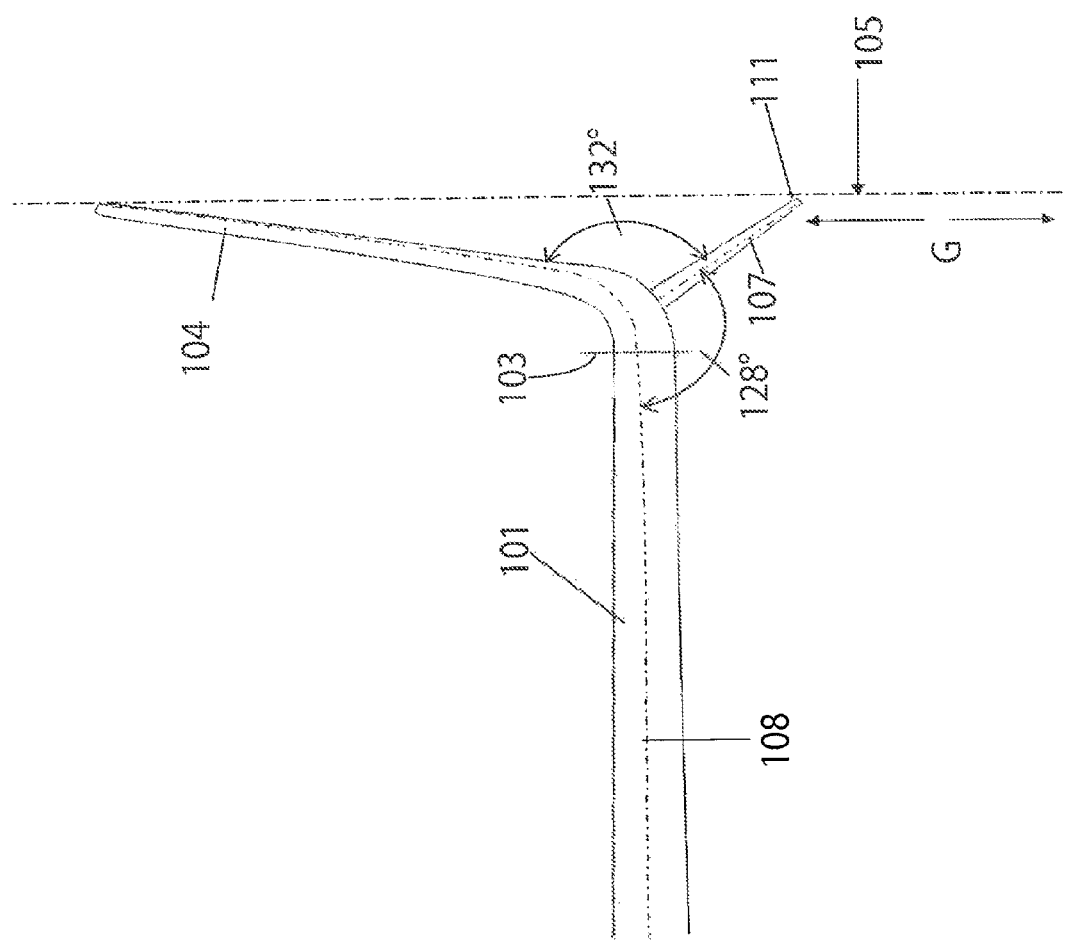
FIG. 4 illustrates the aircraft wing/wing tip device (in the ground shape) according to the first embodiment in detail.

FIG. 4 illustrates the aircraft wing 101 of the first embodiment in greater detail. The lower winglet 107 is sized and oriented so as to maximise the span increase in the flight shape, whilst minimising interference effects at the intersection between the lower winglet 107 and the upper winglet 104. In addition, a ground clearance height G between the ground and the tip 111 of the lower winglet 107 is taken into account. The resultant geometry provides an included angle between the upper and lower wing elements of around 132°, and an included angle between the wing plane 108 and the lower winglet 107 of around 128°. The lower winglet 107 has a winglet planform area of around 20% of the upper winglet 104 planform area. The relatively small size of the lower winglet 107 minimises the viscous drag penalty at cruise whilst delivering the required optimum span loading.

Figures 5, 6:
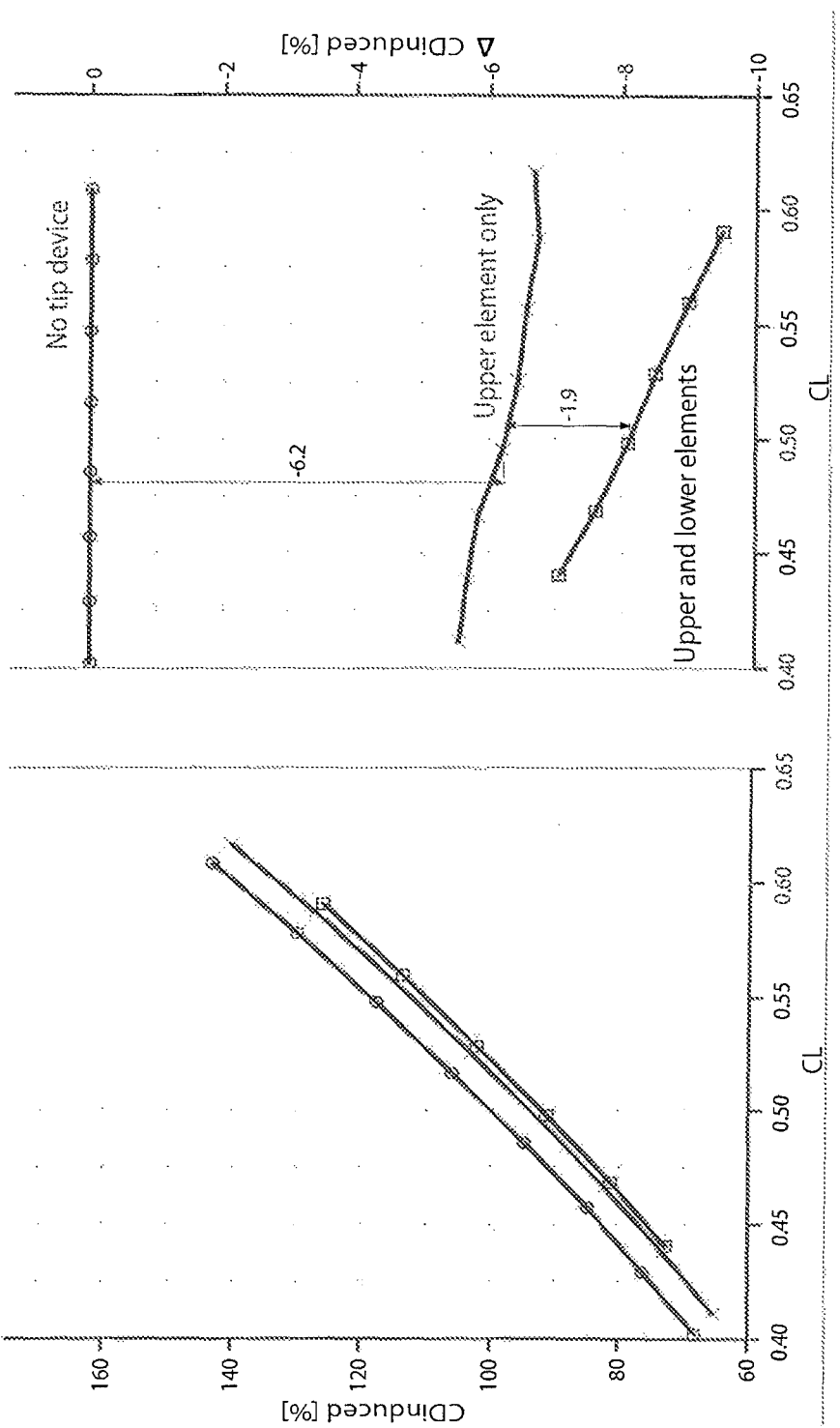
FIGS. 5 and 6 illustrates graphically the further reduction in drag due to the lower element in the first embodiment.

FIGS. 5 and 6 illustrate graphically the effect of the addition of the lower winglet element 107 on the lift and vortex drag characteristics of the wing 101. In FIGS. 5 and 6 the line with circular markers represents a reference wing corresponding to the wing 101 with a tip near to an imposed span limit without any wing tip device. The line with the cross markers illustrate the wing 101 with only the upper winglet element 104 (sized as recommended in NASA T M 81230 entitled "*Effect of Winglets on the Induced Drag of Ideal Wing Shapes*"; R T Jones and T A Lasinski 1980), and the line with the triangular markers represent the wing 101 with both the upper and lower winglet elements 104, 107. FIG. 5 illustrates the relationship between lift and drag coefficients (CL, CD) and shows an improvement in lift to drag ratio for the wing 101 with both the upper and lower winglet element 104, 107 as compared to both the reference wing and the wing with only an upper winglet element. FIG. 6 illustrates a drag saving due to the addition of the lower winglet element 107 of around 1.9% at the mid-cruise weight lift coefficient (CL=0.5) relative to the wing with upper element 104 alone. The vortex drag reduction provided by the lower winglet element 107 is a further reduction of around 25 to 40%.

Figure 7:
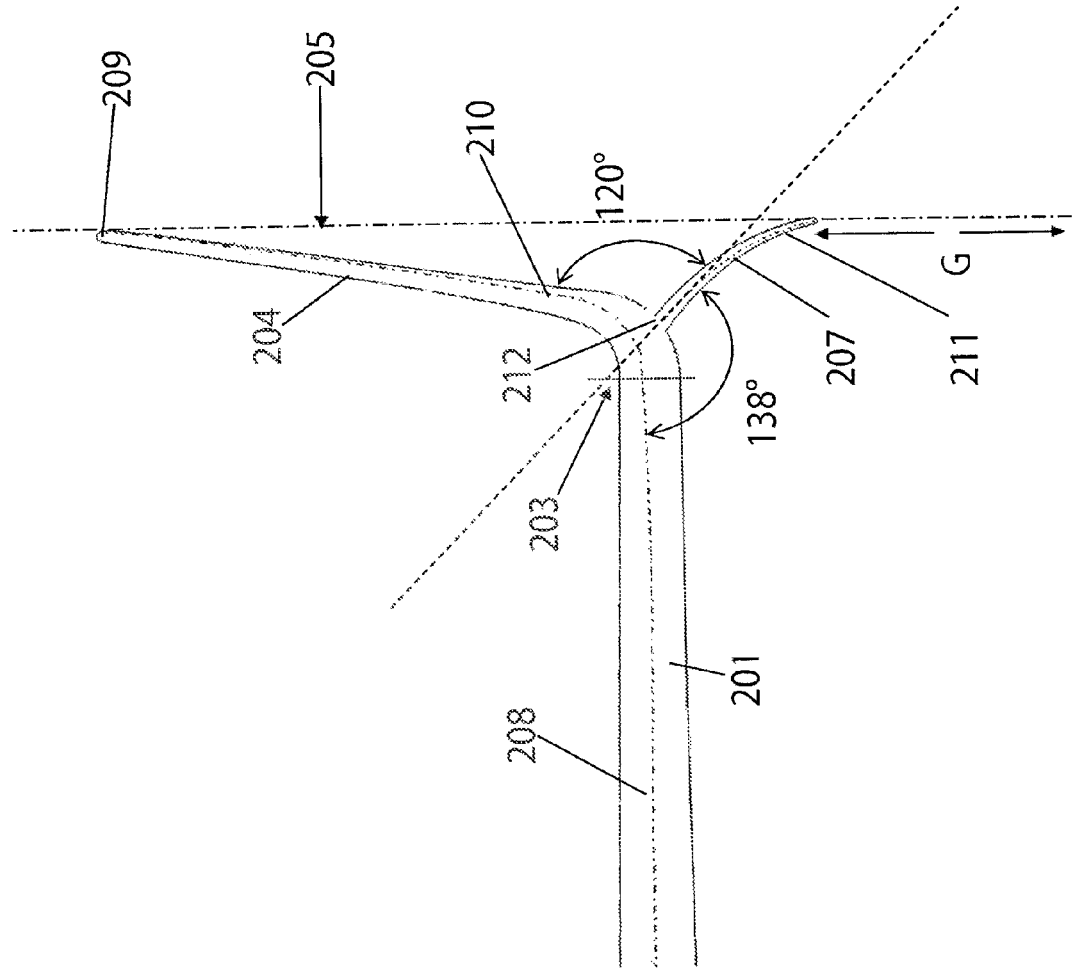
FIG. 7 illustrates an aircraft wing/wing tip device (in the ground shape) according to a second embodiment having a planar upper winglet and a non-planar lower winglet.

FIG. 7 illustrates an aircraft wing 201 according to a second embodiment having a planar upper winglet 204 and non planar lower winglet 207. The wing 201 defines a wing plane 208 and the upper winglet 204 projects upwardly with respect to the wing plane 208. The upper winglet 204 is fixed to the outboard end 203 of the wing 201. The lower winglet 207 has a root chord 212 which intersects with the upper winglet 204. The lower winglet 207 projects downwardly from the intersection. The upper winglet 204 has a tip 209 and a root 210. The lower winglet 207 has a tip 211 that is coincident in the spanwise direction with the tip 209 at the span limit 205. The upper and lower winglets 204, 207 each have a leading edge and a trailing edge and the trailing edges are adjacent at the intersection. The wing 201 is illustrated in FIG. 7 in its ground shape where the span limit 205 is enforced.

The lower winglet 207 has increasing curvature of local anhedral from root 212 to tip 211. The lower winglet 207 may have a toe in on toe-out angle to optimise the low speed performance of the tip device.

The wingtip device for the wing 201 has been optimised so as to maximise the span increase under flight aerodynamic loads, whilst minimising interference effects between the lower winglet 207 and the lower surface of the wing 201, and between the upper and lower winglets 204, 207. The resultant optimised geometry has an included angle between the upper and lower winglets 204, 207 of around 120°, and an included angle between the wing plane 208 and the lower winglet 207 of around 138°. In the flight shape, the lower winglet 207 provides a further gain in span as compared to the lower winglet 107 of the wing 101, principally due to the increased root 212 to tip 211 height of the lower winglet 207 and the flexibility of the lower winglet 207 which straightens under flight loads.

FIG. 8 illustrates an aircraft wing 301 according to a third embodiment having a blended upper winglet 304 and a planar lower winglet 307. The wing 301 has an outboard end 303 to which is fixed the blended upper winglet 304. The upper winglet 304 has a tip 309 and a root 310. The upper winglet 304 is fixed to the outboard end 303 of the wing 301 by its root end 310. The upper winglet 304 has a substantially planar portion 314 and an arcuate transition portion 315. The transition portion 315 is adapted to smoothly blend the outboard end 303 of the wing 301 into the substantially planar portion 314. The arcuate transition portion 315 has a substantially constant radius of curvature R.

The lower winglet 307 is fixed to the lower surface of the transition portion 315 of the upper winglet 304. The lower winglet has a tip 311 and a root 312. The root chord of the lower winglet 307 intersects with the upper winglet 304 and the lower winglet projects downwardly from the intersection. The upper and lower winglets 304, 307 each have a leading edge and a trailing edge and the trailing edges are adjacent at the intersection. The transition portion 315 helps reduce interference effects between the substantially planar portion 314 and the wing 301.

The tip 309 of the upper winglet 304 is substantially coincident in the vertical x-z plane with the tip 311 of the lower winglet 307 at the span limit 305. An included angle between the upper and lower winglets 304, 307 at the intersection is around 84°. It is preferable that this angle is at least 80° so as to avoid interference effects between the upper and lower winglets 304, 307. Since the intersection is on the lower surface of the blended transition portion 315, this angle is measured between the transition portion lower surface tangent and the lower winglet 307. An included angle between the wing plane 308 and the lower winglet 307 is around 125°. The substantially planar portion 314 of the upper winglet 304 has a cant angle relative to the vertical x-z plane of around 7° to 15°.

The lower winglet element 307 has an element planform area of approximately 25% of the upper winglet element 304 planform area. Whilst the lower winglet 307 is substantially planar it may have some wing twist from root 312 to tip 311. The lower winglet 307 may additionally or alternatively have a toe in or toe out angle to optimise low speed performance. Similarly, the upper winglet 304 may have some twist and may have a toe in or toe out angle. The lower winglet 307 has a sweep back angle and in particular the leading edge is swept back. The upper winglet 304 is also swept back and has a swept back leading edge and a swept back trailing edge.

If ground clearance limits allow, then the lower winglet element 307 could be replaced with a non-planar lower winglet element similar to that described above with reference to FIG. 7.

FIG. 9 illustrates an aircraft wing/wingtip device combination comprising a wing 401, a blended upper winglet 404 and planar lower winglet 407. The wing 401 has an outboard end 403 and defines a wing plane 408. The upper winglet 404 includes a substantially planar portion 414 and a blended transition portion 415. The transition portion 415 smoothly blends the outboard end 403 of the wing 401 into the substantially planar portion 414 of the upper winglet 404. The transition portion 415 is a non-planar curved wing tip extension having continuously increasing curvature of local dihedral, continuously increasing sweep back (at both leading and trailing edges) and continuously decreasing chord in the outboard direction. The non-planar curved wing tip extension portion 415 provides improved drag performance for the upper winglet 404 in comparison to the blended upper winglet 304 shown in FIG. 8.

The upper winglet 404 has a root 410 and a tip 409. The substantially planar portion 414 of the upper winglet 414 has cant angle of around 7° to the vertical x-z plane. A substantially planar lower winglet 407 is fixed to the lower surface of the non-planar curved wing tip extension portion 415 of the upper winglet 404. The lower winglet 407 has a tip 411 and a root 412. The root chord of the lower winglet 407 intersects with the upper winglet 404 and the lower winglet projects downwardly from the intersection.

An included angle between the upper and lower winglets 404, 407 at the intersection is around 86°. Since the intersection is on the lower surface of the non planar curved wing tip extension portion 415 of the upper winglet 404, this angle is measured from a local surface tangent to the lower surface of the non-planar curved wing tip extension portion 415 at the intersection. This included angle is preferably greater than 80° to avoid interference effects between the upper and lower winglets 404, 407. An included angle between the wing plane 408 and the lower winglet is around 124°. The tip 409 of the upper winglet 404 is substantially coincident in the vertical x-z plane to the tip 411 of the lower winglet 407 at the span limit 405.

FIGS. 10 and 11 illustrate perspective and plan views respectively of the wing/wingtip device combination of the fourth embodiment. From FIG. 10 in particular it can be seen that the trailing edge 416 of the upper winglet 404, and the trailing edge 417 of the lower winglet 407 are substantially adjacent at the intersection. The trailing edges 416, 417 are sufficiently close that the wake from the lower winglet 407 substantially does not interfere with the flow over the upper winglet 404. The upper winglet 404 has a leading edge 418 that is swept backwards and the lower winglet 407 also has a leading edge 419 that is swept backwards. The trailing edge 416 of the upper winglet 404 is swept backwards and the trailing edge 417 of the lower winglet 407 is also swept backwards.

In FIG. 11, the plan view (i.e. the top down view in the x-y plane) illustrates how the upper winglet 404 "shadows" at least part of the lower winglet 407. This is due to the coincidence of tips 409, 411 of the upper and lower winglets 404, 407 in the vertical x-z plane. As best shown in FIG. 10, the root chord 412 of the lower winglet 407 occupies only part of the local chord of the upper winglet 404 at the intersection. Due to the near coincidence of the trailing edges 416, 417 the leading edge 419 of the lower winglet 407 is positioned substantially aft of the leading edge 418 of the upper winglet 404.

FIG. 12 illustrates an aircraft wing/wingtip device combination according to a fifth embodiment, comprising a wing 501 with a wingtip device comprising an upper non-planar wingtip extension 504 and a lower planar winglet 507. The wing 501 has an outboard end 503 and defines a wing plane 508. The non-planar wingtip extension 504 has a root 510 and a tip 509 and is fixed to the outboard end 503 of the wing 501 by its root 510. The non-planar curved wingtip extension 504 has continuously increasing curvature of local dihedral, continuously increasing sweepback (at both leading and trailing edges 518, 516), and continuously decreasing chord in the outboard direction, y.

The non-planar curved wingtip extension 504 is substantially non-planar from root 510 to tip 509. The tip 509 forms a cant angle of approximately 8° with the vertical x-z plane. The lower winglet 507 has a tip 511 and a root 512 and the root chord intersects with the non-planar curved wingtip extension 504, with the lower winglet 507 projecting downwardly from the intersection. An included angle between the non-planar wingtip extension 504 and the lower winglet 507 at the intersection is approximately 82°. This angle is measured between the lower winglet 507 and a local surface tangent to the lower surface of the non planar curved wingtip extension 504 at the intersection. An included angle between the wing plane 508 and the lower winglet 507 is approximately 126°. The tips 509, 511 of the non-planar curved wingtip extension 504 and the lower winglet 507 are substantially coincident in the vertical x-z plane at the span limit 506.

Figure 13:
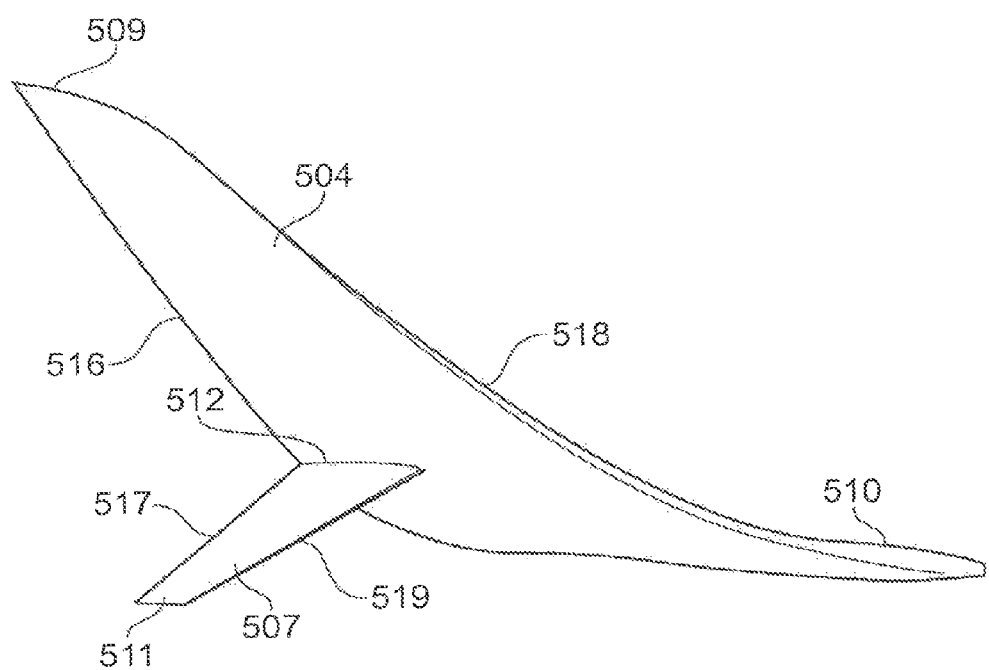
FIG. 13 illustrates a perspective view of the wing tip device of the fifth embodiment.

FIG. 13 illustrates the wingtip device in accordance with the fifth embodiment in a perspective view and clearly shows that the trailing edge 516 of the non-planar curved wingtip extension 504 is substantially coincident with the trailing edge 517 of the lower winglet 507 at the intersection. Both the non-planar curved wingtip extension 504 and the lower winglet 507 have a sweepback angle and the leading and trailing edges 516, 517, 518, 519 each have a respective sweepback angle.

The lower winglet 507 may be only substantially planar and may feature winglet twist from root to tip and a toe in or toe out angle relative to the free stream flow. Similarly, the non planar curved wingtip extension 504 may feature wing twist and a toe in or toe out angle relative to the free stream flow. The lower winglet 507 may be replaced with a substantially non-planar curved lower winglet, similar to that described above with reference to FIG. 7 if ground height clearance limits allow.

Each of the second to fifth embodiments described above with reference to FIGS. 7 to 13 are shown with the respective wing/wingtip device combination in its ground shape. Due to aerodynamic loads on the wing during flight, deformation of the wing will cause rotation of the wingtip device about the wing root such that the tip of the lower wing-like element extends further outboard in the spanwise direction than the tip of the upper wing-like element. The lower wing-like element in each case therefore provides an increase in wing span when compared to wingtip devices having only the upper wing-like element in each case.

The wingtip devices described in the first to fifth embodiments above may be fitted, or retro-fit to the outboard end of an aircraft wing having either no wingtip device or as a replacement for an existing wingtip device. Furthermore, the lower wing-like element may be provided as a retro-fit modification to an existing wingtip device having only an upper wing-like element so as to form a wingtip device according to this invention.

Although the invention has been described above with reference to one or more preferred embodiments, it will be appreciated that various changes or modifications may be made without departing from the scope of the invention as defined in the appended claims.

What is claimed is:

1. A wing tip device for fixing to the outboard end of a wing, the wing defining a wing plane, the wing tip device comprising:
    an upper wing-like element projecting upwardly with respect to the wing plane and having a trailing edge; and
    a lower wing-like element fixed with respect to the upper wing-like element and having a root chord and a trailing edge, the lower wing-like element root chord intersecting with the upper wing-like element, and the lower wing-like element projecting downwardly from the intersection,
    wherein the upper wing-like element is larger than the lower wing-like element and the trailing edge the lower wing-like element is adjacent the trailing edge of the upper wing-like element at the intersection,
    wherein an included angle between the upper and lower wing-like elements at the intersection is less than, or equal to, 160 degrees, and
    wherein the lower wing-like element has an element planform area less than approximately 25% of the upper wing-like element planform area.

2. A wing tip device according to claim 1, wherein an included angle between the wing plane and the lower wing-like element is at least 110 degrees.

3. A wing tip device according to claim 1, wherein the included angle between the upper and lower wing-like elements at the intersection is at least 80 degrees.

4. A wing tip device according to claim 1, wherein the lower wing-like element is substantially planar.

5. A wing tip device according to claim 1, wherein the lower wing-like element is substantially non-planar.

6. A wing tip device according to claim 1, wherein the lower wing-like element has wing twist.

7. A wing tip device according to claim 1, wherein the lower wing-like element has a sweep back angle.

8. A wing tip device according to claim 1, wherein the upper wing-like element includes a substantially planar portion.

9. A wing tip device according to claim 8, wherein the upper wing-like element is substantially planar.

10. A wing tip device according to claim 8, wherein the upper wing-like element further includes an arcuate transition portion adapted to smoothly blend the outboard end of the wing into the substantially planar portion of the upper wing-like element.

11. A wing tip device according to claim 8, wherein the upper wing-like element further includes a non-planar curved wing tip extension adapted to smoothly blend the outboard end of the wing into the substantially planar portion of the upper wing-like element.

12. A wing tip device according to claim 1, wherein the upper wing-like element is a substantially non-planar curved wing tip extension.

13. A wing tip device according to claim 1, wherein the upper wing-like element has a sweep back angle.

14. A wing tip device according to claim 1, wherein the intersection between the lower wing-like element and the upper wing-like element is at the outboard end of the wing.

15. A wing tip device according to claim 1, wherein the intersection between the lower wing-like element and the upper wing-like element is outboard of the outboard end of the wing.

16. A wing having an outboard end and a wing tip device in accordance with claim 1 fixed to its outboard end.

17. An aircraft having a wing according to claim 16.

18. A method of fitting, or retro-fitting, a wing tip device to a wing, the method comprising fixing a wing tip device in accordance with claim 1 to the outboard end of a wing.

19. A method of modifying a wing tip device fixed to, or for fixing to, the outboard end of a wing, the wing defining a wing plane, the existing wing tip device comprising an upper wing-like element projecting upwardly with respect to the wing plane and having a trailing edge, and the method comprising providing a lower wing-like element smaller than the upper wing-like element and having a root chord and a trailing edge, and fixing the lower wing-like element to the upper wing-like element such that: the lower wing-like element root chord intersects with the upper wing-like element, and the lower wing-like element projects downwardly from the intersection; and that the trailing edge of the lower wing-like element is adjacent the trailing edge of the upper wing-like element at the intersection; and that an included angle between the upper and lower wing-like elements at the intersection is less than, or equal to, 160 degrees, and that the lower wing-like element has an element planform area less than approximately 25% of the upper wing-like element planform area.

20. A method of operating a wing having a wing tip device fixed to the outboard end of the wing, the wing defining a wing plane, and the wing tip device comprising:

an upper wing-like element projecting upwardly with respect to the wing plane and having a trailing edge; and a lower wing-like element fixed with respect to the upper wing-like element and having a root chord and a trailing edge, the lower wing-like element root chord intersecting with the upper wing-like element, and the lower wing-like element projecting downwardly from the intersection, wherein the upper wing-like element is larger than the lower wing-like element and the trailing edge of the lower wing-like element is adjacent the trailing edge of the upper wing-like element at the intersection, wherein an included angle between the upper and lower wing-like elements at the intersection is less than, or equal to, 160 degrees, and wherein the lower wing-like element has an element planform area less than approximately 25% of the upper wing-like element planform area, and the method comprising subjecting the wing to aerodynamic loads such that the wing shape undergoes aeroelastic deformation to a state in which wing bending causes rotation of the wing tip device about the wing root such that the tip of the lower wing-like element extends further outboard in the spanwise direction than the tip of the upper wing-like element.

\* \* \* \* \*